United States Patent Office 3,179,123
Patented Apr. 20, 1965

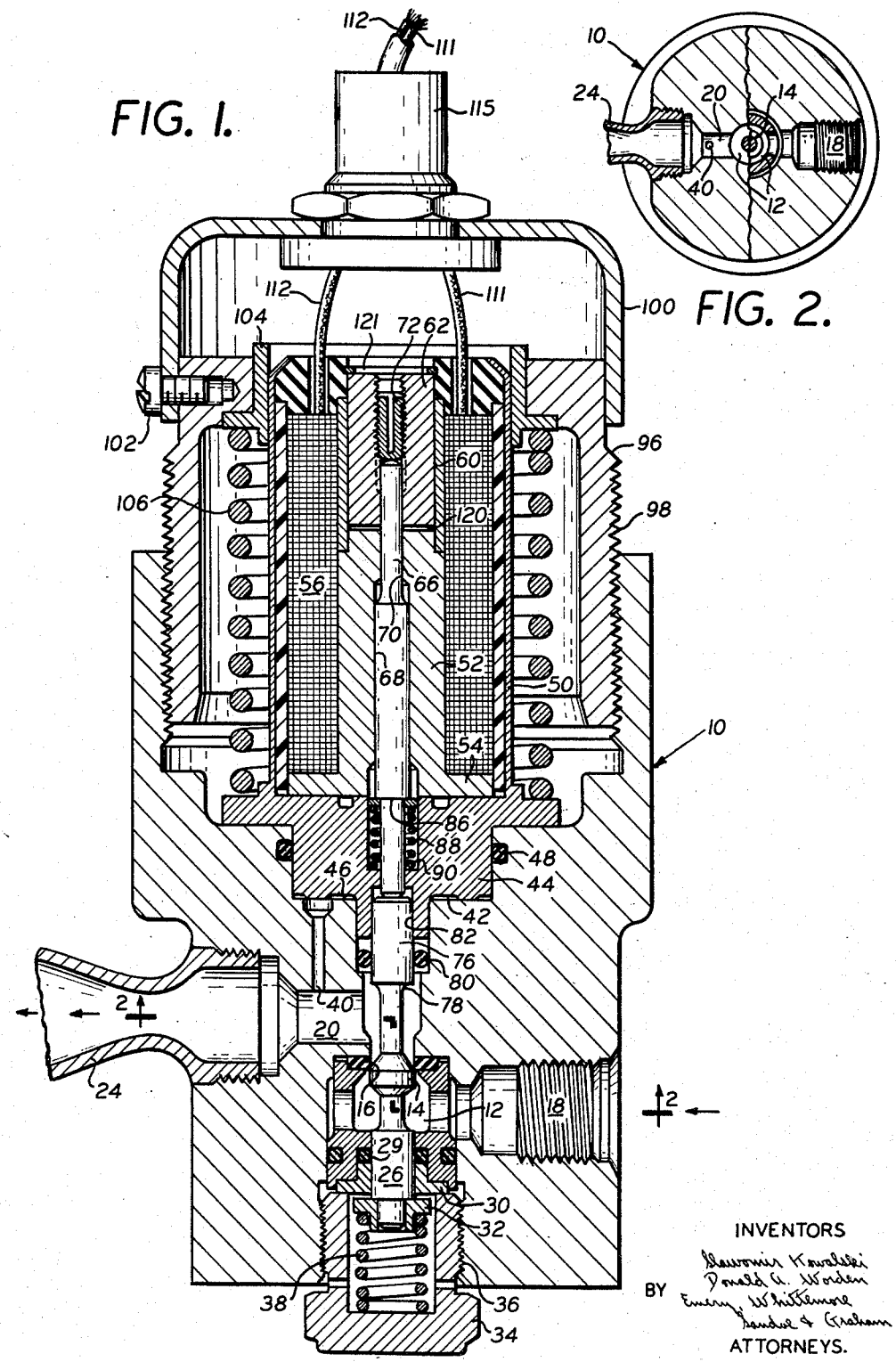

3,179,123
REGULATOR AND SHUT-OFF VALVE FOR
ROCKET THRUST CONTROL
Slawomir Kowalski, 49 Meadowview Ave., Rockaway,
N.J., and Donald A. Worden, 99 West End Ave., Pompton Plains, N.J.
Filed Apr. 10, 1963, Ser. No. 271,992
4 Claims. (Cl. 137—495)

This invention relates to a combination pressure regulator and shut-off valve. The invention is intended primarily for supplying fluid at a constant pressure to a jet nozzle, but it can be used for other purposes.

One object of the invention is to provide a controller which can be used for supplying fluid to the small jets that are used on missiles for changing orientation. Such jets are only operated at certain times and usually for short periods. It is essential to have means suitable for remote control for initiating the flow of fluid and for shutting it off, and to have pressure-regulating mechanism for ensuring an accurately controlled flow of fluid when the valve is open. Unless the flow of fluid and the pressure are accurately controlled, the amount of thrust for a given period of actuation cannot be determined from a distance.

It is another object of the invention to provide a controller having a valve element which operates as a shut-off valve, and to have a pressure-regulating mechanism which can be connected to or disconnected from the valve element selectively and in response to the supply of electric current to an electro-magnetic device. Although an electro-magnetic device is the preferred construction, some features of the invention can be used with other motor means.

In its preferred construction, the invention has lost motion in the connection between the pressure-regulator mechanism and the valve element. When it is desired to open the valve and to have it controlled by the pressure-regulator mechanism, the lost motion is taken up, preferably by a magnet.

Other objects, features and advantages of the invention will appear or be pointed out as the description proceeds.

In the drawing, forming a part hereof, in which like reference characters indicate corresponding parts in all the views;

FIGURE 1 is a vertical sectional view through a combination regulator and shut-off valve made in accordance with this invention; and FIGURE 2 is a sectional view taken on the line 2—2 of FIGURE 1.

The apparatus includes a housing 10 containing a valve chamber 12 in which there is a valve element 14. This valve element 14 is a poppet-type valve which closes against a seat 16 to shut off flow of fluid through the valve chamber. Fluid enters the valve chamber 12 through an inlet passage 18, and flows from the valve chamber through an outlet passage 20 leading to a jet nozzle 24 which is shown as connected with the housing 12 in the illustrated construction.

The valve element 14 is counterbalanced by a lower stem element 26 which extends through an opening in one end of the valve chamber and through a sealing ring 29 which is held in place by a bushing 30. The lower stem portion 26 extends through the bushing 30 and has a collar 32 secured to its lower end.

A cap 34 screws into the lower end of the housing 10 and is held in the housing by threads 35. A spring 38 is compressed between the collar 32 and the end of the cap 34.

The outlet passage 20 communicates with another passage 40 leading to a space which serves as a pressure chamber 42 in the housing 10. This pressure chamber is preferably cylindrical and in general alignment with the valve element 14. A piston 44 is located in the pressure chamber 42 and this piston 44 is movable toward and from the end wall 46 through which the passage 40 opens into the pressure chamber 42.

The piston 44 is surrounded by an O-ring 48 located in a circumferential groove in the wall of the cylindrical pressure chamber 42. This packing or O-ring 48 prevents leakage of pressure past the piston 44. It will be evident that O-ring 48 could alternatively be located in a groove in the cylindrical wall of the piston 44.

Piston 44 is part of a pressure-regulating mechanism and it constitutes a movable wall of the pressure chamber 42. In the drawing, the piston 44 is shown in contact with the end wall 46, but as pressure exerted through the passage 44 increases, it moves the piston 44 away from the wall 46 in manner which will be more fully explained.

At the top or back of the piston 44 there is a sleeve 50, shown in the drawing as an integral part of the piston 44; and this sleeve 40 encloses an electro-magnet consisting of a core 52 having an end flange 54, and windings 56. At the upper end of the core 52, there is a sleeve 60 which serves as a bearing for a plunger 62. The plunger 62 is made of ferrous material as is core 52, and when the windings 56 are energized, the plunger 62 is attracted to the core 52.

There is a push rod 66 which extends through an axial opening 68 in the core 52 and through a corresponding axial opening 70 in the plunger 62. A threaded plug or abutment 72 screws into the upper end of the opening 70 and this plug or abutment 72 contacts with the end of the rod 66 to push the rod 66 downward when the plunger 62 moves downward. The position of the piston 44 for any given position of the plunger 62 can be adjusted by screwing the abutment 72 up or down in the upper end of the opening 70.

At the lower end of the push rod 66, the rod extends into contact with, or adjacent to, an upper stem 76 of the valve element 14. There is a shoulder 78 on the valve stem 76 with a diameter sufficient to counterbalance the valve element 14 with respect to pressure on the downstream side of the valve element; and there is a packing consisting of an O-ring 80 beyond the shoulder 78 for preventing leakage of fluid along the valve stem 76. In the construction shown, the valve stem 76 extends into a counterbore 82 in a portion of the piston 44, but it will be evident that the valve stem 76 can be made shorter if the push rod 66 is made longer.

There is a shoulder 86 on the push rod 66 in position to compress a spring 88 between the shoulder 86 and a lower shoulder 90 of the piston 44. This spring 88 urges the push rod 66 upwardly into contact with the adjustable abutment 72. This prevents the weight of the push rod 66 from resting on the end of the valve stem 76.

Upper portion 96 of the housing 10 is attached to the lower portion of the housing by threads 98 and there is a cap 100 attached to the upper portion of the housing by a screw 102. Within the upper portion 96 there is a sleeve 104 having an abutment surface at its lower end; and a spring 106 is compressed between the lower end of the sleeve 104 and a shoulder of the piston 44. This spring 106 urges the piston 44 downward into contact with the end wall 46 when there is no pressure under the piston 44 or when the pressure is insufficient to overcome the force of the spring 106. The pressure of the spring 106 can be adjusted by screwing the upper portion 96 of the housing further into or out of the complementary threads which connect it with the lower portion of the housing 10. The sleeve 104 is an integral part of the upper portion 96 of the housing.

Electric power is supplied to the windings 56 through conductors 111 and 112. These conductors extend through a fitting 115 at the top of the cap 100. Power is supplied to the conductors 111 and 112 from a battery or other suitable source, and when the invention is used on missiles and rockets, the supply of power to the conductors 111 and 112 is in response to radio signals received by the missile or rocket.

In the operation of the invention, the adjustable abutment 72 is adjusted so that it contacts with the upper end of the push rod 66, and the push rod 66 contacts with the upper end of the valve stem 76 when the valve element 14 is in the closed position and there is a gap 120 between the core 52 and the plunger 62. The extent of the gap 120 depends upon the maximum opening of the valve element 14 which is desired in operation of the invention. The spring 38 holds the valve element 14 closed, and the spring 88 holds the push rod 66 up against the adjustable abutment 72.

There is no flow of fluid from the inlet passage 18 to the outlet passage 20 so long as the valve element 14 remains in closed position. When it is desired to supply fluid to the outlet passage 20, the windings 56 of the electro magnet are energized and this causes the core 52 to attract the plunger 62 so that the plunger is moved downward for a distance equal to the clearance 120, and valve element 14 is moved into open position.

Flow of fluid past the valve element 14 causes a rise in pressure in the outlet passage 20, and when this pressure, which is transmitted through the passage 40 to the pressure chamber 42 reaches a value sufficient to overcome the force of the spring 106, the piston 44 rises and lifts the core 52 so that the plunger 62, which is in contact with the core 52, is also lifted. This permits the spring 88 to move the rod 66 upward and the upward displacement of the rod 66 permits the spring 38 to move the valve element 14 toward closed position. The extent to which the valve element 14 moves will depend upon the extent to which the piston 44 moves and this in turn is dependent upon the pressure in the chamber 42. This operation of the piston 44 to shift the valve element 14 toward and from the seat 16 is in accordance with conventional pressure regulator practice.

Whenever the flow of fluid to the outlet passage 20 is to be shut off, it is merely necessary to break the electric circuit to the windings 56 and when the windings are no longer energized, the plunger 62 moves away from the core 52 and opens up the clearance 120 again. Upward movement of the plunger 62 is limited by a stop comprising a snap ring 121 attached to the sleeve 50.

The plunger 62 and core 52 with the clearance 120 which can be opened and closed constitutes a lost motion connection between the piston 44 and the valve stem 76. As long as this lost motion is free to open and close, the piston 44 of the pressure regulating mechanism can operate without affecting the valve element 14, but when the windings 56 are energized, the lost motion is taken up and motion of the piston 44 is transmitted to the valve element 14 as in any other pressure regulator. The balanced valve element 14 (by virtue of the equal area of seals 29 and 80 and seat 16) makes the unit able to maintain constant outlet pressure (and therefore constant thrust) with a wide range of outlet pressures. This is an important consideration in a system operated from a storage reservoir with gradually decaying inlet pressure.

The preferred embodiment of the invention has been illustrated and described, but changes and modifications can be made and some features can be used in different combinations without departing from the invention as defined in the claims.

What is claimed is:

1. Control apparatus for supplying fluid to a jet nozzle at constant pressure including a housing having a valve chamber with an inlet passage and an outlet passage from which fluid flows to the jet nozzle, a valve element in the chamber for controlling the flow of fluid through the chamber, pressure-regulating mechanism operated by pressure of fluid in the outlet passage, the pressure-regulating mechanism being operable independently of the valve element, and magnetic means responsive to an electric supply to operably connect the pressure regulator with the valve element, and characterized by the pressure regulator having a space therein with a movable wall and a passage leading from said space to the outlet passage through which fluid is supplied to the jet nozzle whereby the movable wall is subject to the pressure of the fluid supplied to the jet nozzle, an electro-magnet attached to the movable wall and movable as a unit therewith, an actuator for the valve element, and magnetic parts of the actuator and the electro-magnet relatively movable with respect to one another and including ferrous faces of the actuator and electro-magnet confronting one another across a gap that is closed to connect the actuator with the electro-magnet when the electro-magnet is energized.

2. A fluid flow controller including a housing having a valve chamber therein, a valve seat in the chamber and a valve element movable toward and from the seat to shut off flow through the valve chamber and to regulate the rate of flow, the valve element being a poppet valve with counterbalancing portions connected thereto on both the upstream and downstream side of the valve element, a spring urging the valve element toward closed position, inlet and outlet passages communicating with the valve chamber on opposite sides of the valve seat, a pressure-regulator space within the housing and in general alignment with the valve chamber, a passage through which the outlet passage connects with the pressure-regulator space through an end wall of the space, a piston in the pressure-regulator space and constituting a movable wall of said space, a spring urging the piston toward the end wall through which the passage opens from said outlet passage, an electro-magnetic coil carried by the piston and movable as a unit therewith, a valve stem extending from the valve element toward the magnetic coil, a push rod in axial alignment with the valve stem and surrounded by the coil, the push rod being in contact with the valve stem at one end of the rod, a ferrous plunger at the other end of the push rod and having an annular bottom face, a ferrous core in the coil and having an annular top face confronting said bottom face across a gap that is closed when the coil is energized to attract the plunger to the core, and to move the rod in the direction of the valve element when the coil is energized, and a spring urging the valve element in the other direction.

3. The fluid flow controller described in claim 2 characterized by the plunger having adjustable abutment means for controlling the position of the push rod and valve stem corresponding to any given position of the plunger.

4. A jet thrust controller including a housing having a valve chamber, fluid intake and outlet passages communicating with the chamber, said chamber having a passage therein surrounded by a valve seat and dividing the chamber into an inlet side and an outlet side, a valve element in the chamber movable into different positions toward and from the seat to control the flow and rate of flow of fluid through the chamber from the inlet side to the outlet side thereof, the valve element having stems extending therefrom across both sides of the chamber, the stems at opposite ends of the chamber having counterbalancing areas thereon so that the valve element is balanced on both the inlet and outlet sides of the chamber, pressure regulating mechanism including a pressure chamber, a passage leading from said pressure chamber and communicating with the outlet passage and a movable wall of the pressure chamber, and motion-transmitting connections between the movable wall and the valve element comprising disconnected elements including two confronting faces of ferrous material and that are attracted toward one another across a gap that constitutes a disconnection of the motion-transmitting connections, and electro-magnetic operating means for bringing said confronting faces together and connecting said disconnected elements to transmit motion from the movable wall to the valve element, said motion-transmitting connections being oriented to move the valve element to closed position in response to moving of said wall with increase in the pressure in the outlet passage.

References Cited by the Examiner
UNITED STATES PATENTS

| | | | |
|---|---|---|---|
| 2,934,090 | 4/60 | Kenamm et al. | 251—368 XR |
| 3,071,147 | 1/63 | Dudzinski | 137—495 XR |

MARTIN P. SCHWADRON, *Acting Primary Examiner.*